(12) United States Patent
Tehrani

(10) Patent No.: US 12,657,613 B2
(45) Date of Patent: Jun. 16, 2026

(54) SYSTEM AND METHOD FOR FACILITATING ELECTRONIC SALES

(71) Applicant: Fleur T. Tehrani, Anaheim, CA (US)

(72) Inventor: Fleur T. Tehrani, Anaheim, CA (US)

( * ) Notice: Subject to any disclaimer, the term of this patent is extended or adjusted under 35 U.S.C. 154(b) by 549 days.

(21) Appl. No.: 18/081,312

(22) Filed: Dec. 14, 2022

(65) Prior Publication Data

US 2023/0111209 A1 Apr. 13, 2023

Related U.S. Application Data

(60) Provisional application No. 63/395,688, filed on Aug. 5, 2022.

(51) Int. Cl.
*G06Q 30/00* (2023.01)
*G06Q 30/0601* (2023.01)

(52) U.S. Cl.
CPC ..... *G06Q 30/0621* (2013.01); *G06Q 30/0641* (2013.01)

(58) Field of Classification Search
CPC .......... G06Q 30/0641; G06Q 30/0621; G06Q 30/06211; G06Q 30/06212; G06Q 30/0643; G06Q 30/06431; G06Q 30/06432; G06Q 30/06433; G06Q 30/06434; G06Q 30/06435; G06Q 30/0644; G06Q 30/06442; G06Q 30/06444
USPC ...................................................... 705/26, 27
See application file for complete search history.

(56) References Cited

U.S. PATENT DOCUMENTS

| | | | | |
|---|---|---|---|---|
| 9,652,654 | B2 * | 5/2017 | Li | G06Q 30/0641 |
| 9,905,019 | B2 * | 2/2018 | Applegate | G06T 7/30 |
| 10,223,724 | B1 * | 3/2019 | Lavin | G06Q 30/0621 |
| 11,004,128 | B1 * | 5/2021 | Mishra | G06Q 30/0621 |

(Continued)

OTHER PUBLICATIONS

Liu et al., "Construction of a Prediction Model for Body Dimensions Used in Garment Pattern Making Based on Anthropometric Data Learning," Journal of the Textile Institute, Apr. 2017, 10pgs. (Year: 2017).*

(Continued)

*Primary Examiner* — Robert M Pond
(74) *Attorney, Agent, or Firm* — Mark Kendrick

(57) ABSTRACT

Systems and methods are described for facilitating electronic sales and for electronically customizing a user's selected choice of merchandise over a communication channel. The system includes at least one data base for storing the users' input data, instructions for operating an input field as well as various software, links to various websites of suppliers of merchandise, and for transmitting messages over communication channels. The system includes at least one processing system configured to execute the instructions to perform the method. The method may include displaying to a user, over a communication network, one or more input fields for entering data, messages, and photos, and receiving from the user, over the communication network and by entering into an input field, messages, data, a selection of merchandise, personal measurements, and personal photos, over the communication channel. The method may further include displaying to the user, modified and/or customized user's input data and/or photos, to receive a user's final selection of merchandise, and to output the said selection to execute a sales process.

17 Claims, 5 Drawing Sheets

(56)  References Cited

U.S. PATENT DOCUMENTS

| | | | | |
|---|---|---|---|---|
| 2006/0149638 A1* | 7/2006 | Allen | ...................... | G06Q 50/04 |
| | | | | 705/27.2 |
| 2008/0126962 A1* | 5/2008 | Cook | ...................... | G06F 16/58 |
| | | | | 715/764 |
| 2014/0279289 A1* | 9/2014 | Steermann | .............. | G06T 11/60 |
| | | | | 705/27.2 |
| 2017/0039775 A1* | 2/2017 | Applegate | ................. | G06T 7/30 |
| 2021/0390430 A1* | 12/2021 | Aristizabal | ......... | G06F 18/2178 |
| 2022/0076317 A1* | 3/2022 | Yang | ......................... | G06T 7/13 |

OTHER PUBLICATIONS

Liu et al., "Construction of a prediction model for body dimensions used in garment pattern making based on anthropometric data learning," The Journal of The Textile Institute, Apr. 10, 2017, 10pgs. (Year: 2017).*

* cited by examiner

100

101

102

106

Web
Servers

Electronic
Communication
Network

User
Communication
Device

103

Data
Bases

Processing
Systems

104

105

SYSTEM AND METHOD FOR FACILITATING ELECTRONIC SALES

RELATED APPLICATION

This application claims priority to U.S. provisional patent application Ser. No. 63/395,688, filed Aug. 5, 2022 and entitled "System and Method for Facilitating Electronic Sales," the disclosure of which is hereby incorporated by reference in its entirety.

TECHNICAL FIELD

The present disclosure relates generally to systems and methods for effectively managing personal sales via electronic communication. More specifically and without limitations, the present disclosure relates to systems and methods for electronically presenting different sales alternatives to a user, electronically acquiring input data from a user, customizing and/or modifying the user's selected sales items in accordance with the user's provided input data and presenting the said modified and/or customized data to the user electronically, receiving the user's final selected merchandise and outputting the said selection to carry out a sales procedure.

BACKGROUND

As more people turn to electronic communications to purchase personal goods, many may find themselves unable to choose between different alternatives with sufficient knowledge about the suitability of the sales items or how they compare with each other. This is due to the fact that the users are not able to try the items on themselves, for example glasses, scarves, hats, wigs and apparel items, and may not be able to assess how the items look on them and/or fit them. Systems and methods are described here to provide customized information to a user through an electronic network and thereby enable the user to make a more informed decision on his/her online purchases.

SUMMARY

In accordance with the present disclosure, systems and methods are described for electronically modifying and/or customizing a user's selected sales item over a communication network that can include computers as well as cell phones and other electronic devices. The user may provide information that may include personal data, measurements, and photos via an electronic channel.

The users' information is stored in a data base that further stores information on various merchandise and the links to their respective websites. Upon receiving a user's selected merchandise for his/her consideration, the data base stores the received data. The system includes at least one processing system that is configured to execute stored coded instructions on the user's input data in conjunction with the user's selected sales alternatives. Examples of the sales alternatives may include scarves, wigs, hats, glasses, hair color, jewelry, various kinds of outfits, etc. The coded instructions used by the processor may include instructions and codes to analyze a user's provided measurements, and codes for modifying and/or customizing the user's provided photo(s) in conjunction with his/her selected sales alternatives by using appropriate software such as Adobe Photoshop. Examples of a user's measured data may include the user's height, weight, hips, waist, bust, collar lengths and head size. After the execution of the said codes and instructions, the system may provide and display to the user the modified and/or customized data and/or photos of the items considered for purchase by the user through a computer network or cell phone. The system may then receive the user's final selected merchandise for purchase and communicates that information to a processing system to carry out the sales procedure.

BRIEF DESCRIPTION OF THE DRAWINGS

As used herein, characters such as numerals refer to like elements.

The accompanying figures illustrate exemplary aspects and an embodiment of this disclosure.

DETAILED DESCRIPTION

Figure 1:
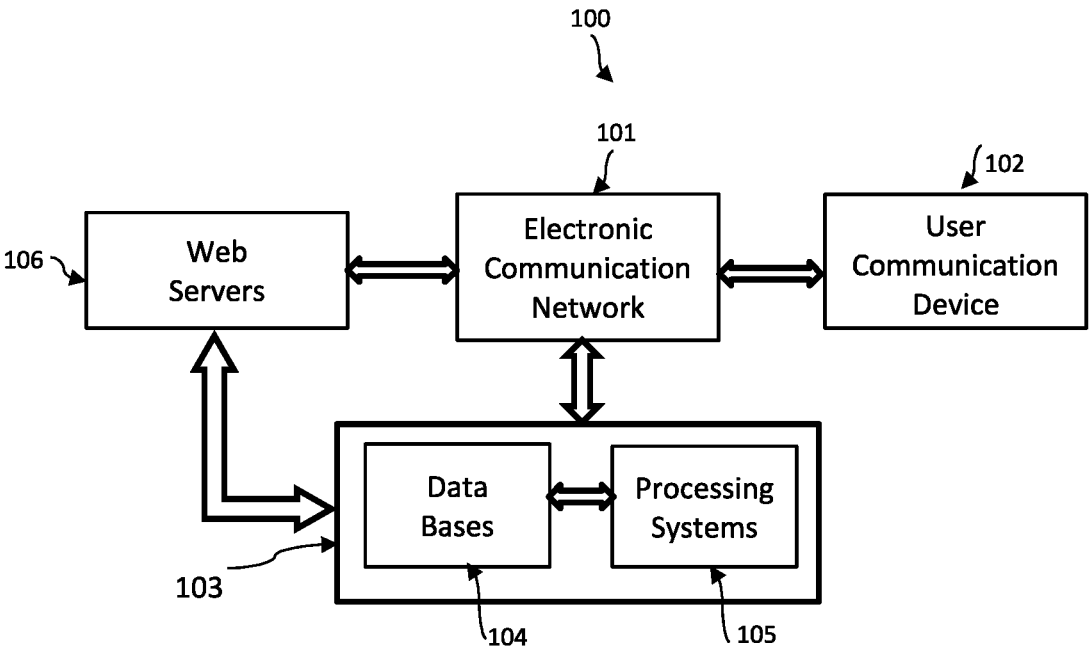
FIG. 1 is a block diagram of an example communication environment of the invention.

FIG. 1 is a block diagram of an exemplary environment 100 of the present invention. This environment may include an Electronic Communication Network 101 that may include any system that people may use for sending and receiving communications, whether via an Internet or the cellular network. This system provides data to a user and receives data from the user through the User Communication Device 102 that may be any digital system by the user including computers or mobile devices such as cell phones or tablets. The Storage and Execution System 103 includes the systems Data Bases 104 and the Processing Systems 105 that is coupled to Data Bases 104. The Data Bases 104 contain the input and users' data files, the information and links of various merchandise suppliers, various instruction codes and software. The processing Systems 105 that is coupled to Data Bases 104, contain the units for processing the users' data, the execution of the codes of instruction, and the display and message sending engines. The Storage and Execution System 103 is linked to the Electronic Communication Network 101 and Web Servers 106 which in turn is in communication with the Electronic Communication Network 101.

Figure 2:
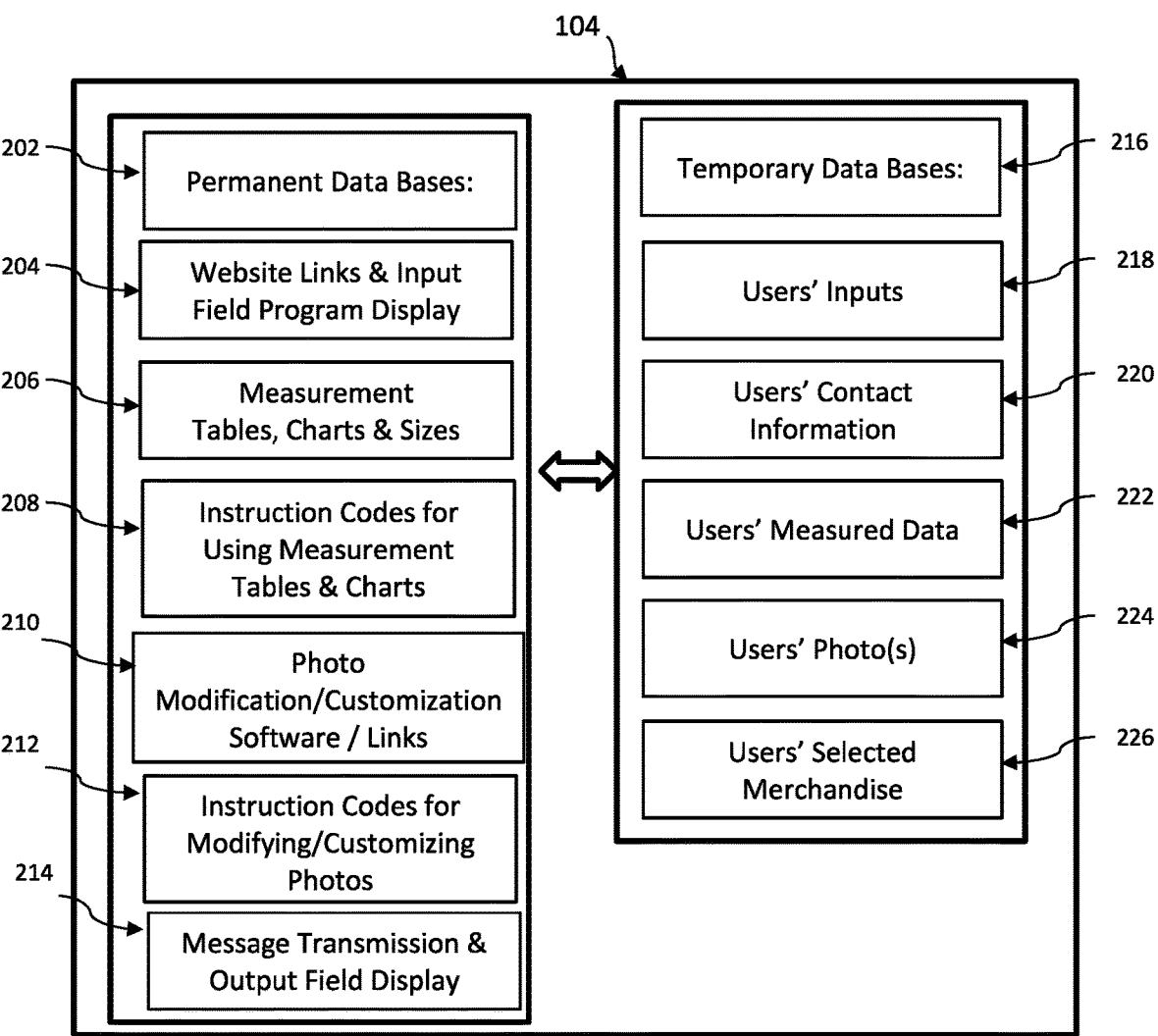
FIG. 2 is a block diagram of an exemplary Data Base system consistent with the embodiments of the present invention.

FIG. 2 is a block diagram of an exemplary Data Bases 104 that may include Permanent Data Bases 202 and Temporary Data Bases 216. The Permanent Data Bases 202 may contain links to various Websites and an Input Field Program Display 204 for controlling how an input field is displayed, standard Measurement Tables, Charts and Sizes for various apparel 206, Instruction Codes for Using Measurement Tables and Charts 208, Photo Modification/Customization Software or links to such software (e.g., Adobe Photoshop) 210, Instruction Codes for Modifying/Customizing Photos 212 which will be based on the used software, the user's photo (e.g., a portrait photo) and the type of merchandise, and a Message Transmission & Output Field Display Program 214 for controlling how the output is displayed based on the user's interactions. The Temporary Data Bases 216 may store optional data/input provided by the users. It may contain User's Inputs 218, User's Contact Information 220 that may include a user's telephone number, address and Email, User's Measured Data 222, User's Photo(s) 224, and User's Selected Merchandise 226, provided by a user through an input field program.

Figure 3:
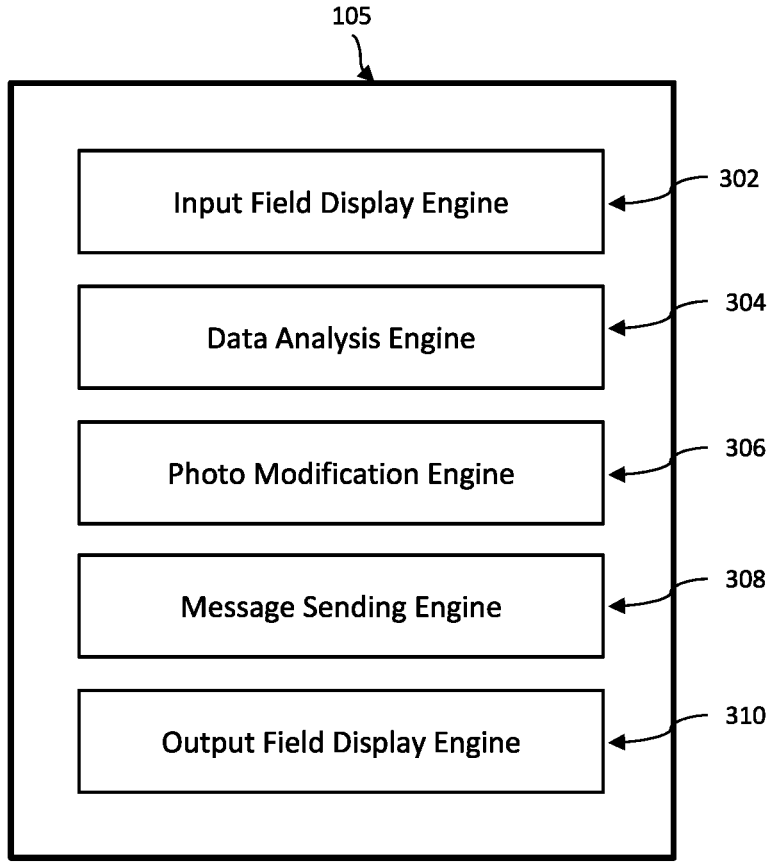
FIG. 3 is a block diagram of an exemplary Processing System consistent with the embodiments of the invention.

FIG. 3 shows an exemplary Processing Systems 105. In computer programming, an engine is a program that performs a core or essential function for other programs. Engines are used in operating systems, subsystems or application programs to coordinate the overall operation of other programs. The term engine is also used to describe a special-purpose program that uses deep learning algorithms to query data. A search engine is a software program that enables the users find the information they are looking for online by using keywords or phrases. The exemplary Processing Systems 105 shown in FIG. 3 may contain an Input Field Display Engine 302. The Input Field Display Engine is a software program that enables the web users to supply data to the web server. The Input Field Display Engine is a software program for executing control, modification, and display of an input field in accordance with a user's interactions. The Processing Systems 105 may contain a Data Analysis Engine 304 which is a software program that applies computational data analytics techniques to find user-focused, data-driven output solutions. The Data Analysis Engine 304 uses and analyses the user's measurement data. The Processing Systems 105 may contain a Photo Modification Engine 306 which is a software program for managing, editing, and sharing digital pictures and is used for modification and customization of a user's one or more photos. The Processing Systems 105 may contain a Message Sending Engine 308, which is a software program for sending text messages, emails, and SMS messages and an Output Field Display Engine 310 which is a software program for displaying the output data and is used for execution, control and display of an output field based on the user's selections and interactions.

Figure 4:
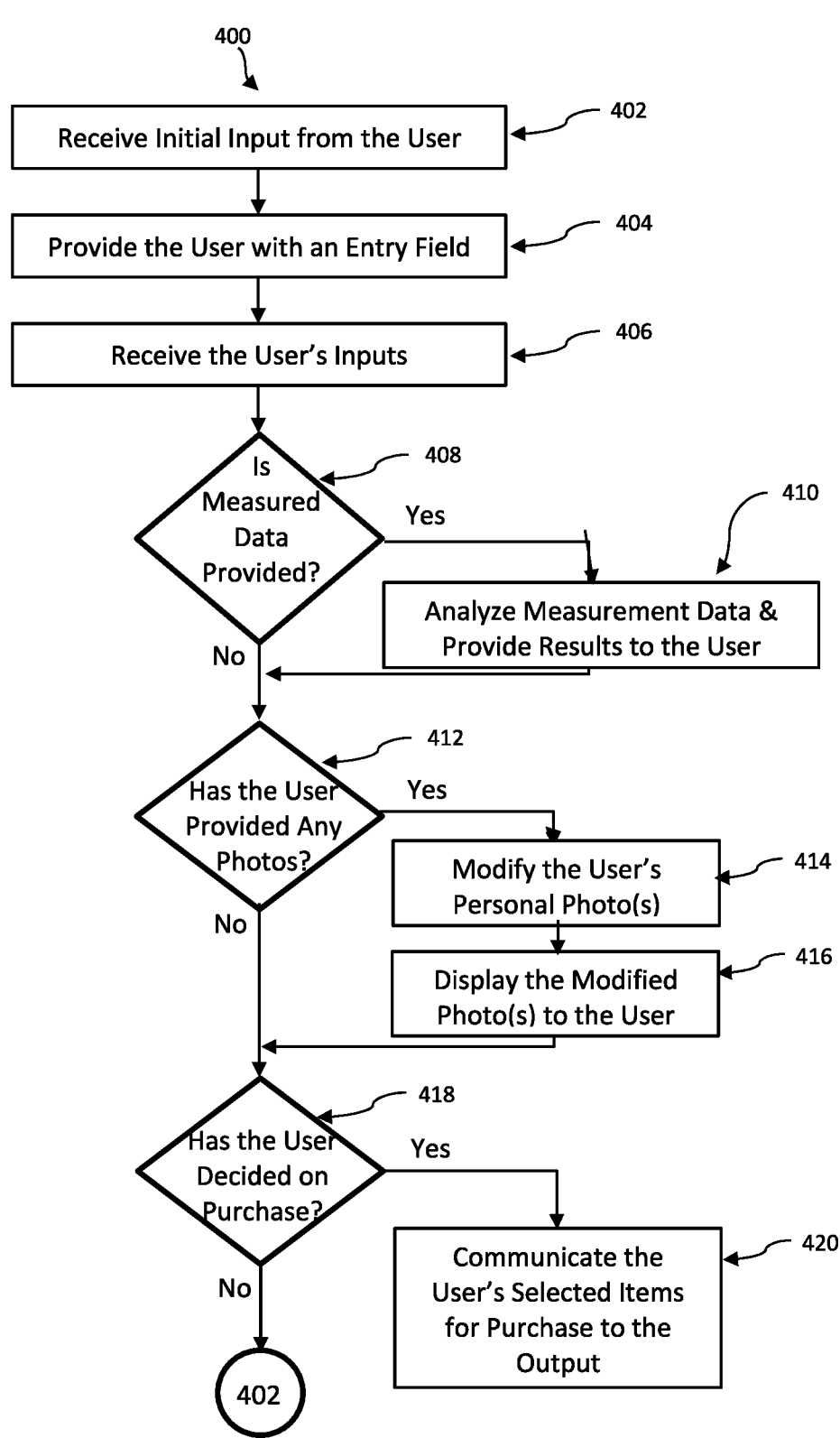
FIG. 4 displays the flowchart of the method of an exemplary embodiment of the invention.

FIG. 4 shows the flowchart 400 of the method of an exemplary embodiment of the invention. At the initial step 402, the system receives initial input from a user. That initial information may include selected website(s) and/or alternative merchandise considered by the user. At the next step 404, the user is provided with an entry field to provide optional data that may include selected alternative merchandise, personal measurements and/or photo(s). At the next step 406 the user's information provided in step 404 is received by the system. At the step 408 that follows next, the system checks if the user is considering purchasing outfit such as clothes and whether he/she has provided his/her personal measured data. If the answer to this question is Yes, the step at 410 is performed at which the system analyses the user's measurement data and may provide the user with suggestions and/or photos for example of models of approximately the same size of the user wearing the selected outfit. Back to step at 408, if the answer to the raised question at step 408 is No, the step at 410 is not performed and the procedure continues to the following step at 412. At step 412, the system considers whether the user has provided any personal photo(s). If the answer is Yes, the step at 414 is performed. At step 414, the system modifies and/or customizes the user's photo(s) by using the user's selected merchandise. The step 414 may involve using expert software for modifying photos such as the Adobe Photoshop. After the completion of step 414, the system may display to the user the modified/customized photo(s) at step 416. Thereafter, the procedure is transferred to step 418. Back to step 412, if the user has not provided any photos, then the next step at 418 is followed at which, the system determines if the user has decided on any item to purchase. If the user has selected any items to purchase, at the next step at 420, those selections are communicated to a processor for carrying out the purchase. However, if at step 418, the user has not decided on any purchase, the system may transfer to the beginning of the procedure at 402.

As an example, if a user is interested in buying a sweater as determined initially by the system at step 402, the user may provide measured data including weight, height, collar, bust, hips, and waist sizes to the system. This information will be analyzed by the system at step 410 to determine an appropriate size. The system may further display to the user photos of the sweater of the user's choice worn by models of similar size as the user, or computer-generated photos of the sweater on a manikin of the same size as the user at step 410. As another example, if the user's interest is a wig or a hat as determined at step 402, and the user provides a portrait photo, the system generates a modified user's photo wearing the wig or the hat of interest at step 414 and may display that modified photo to the user at step 416.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Figure 5:
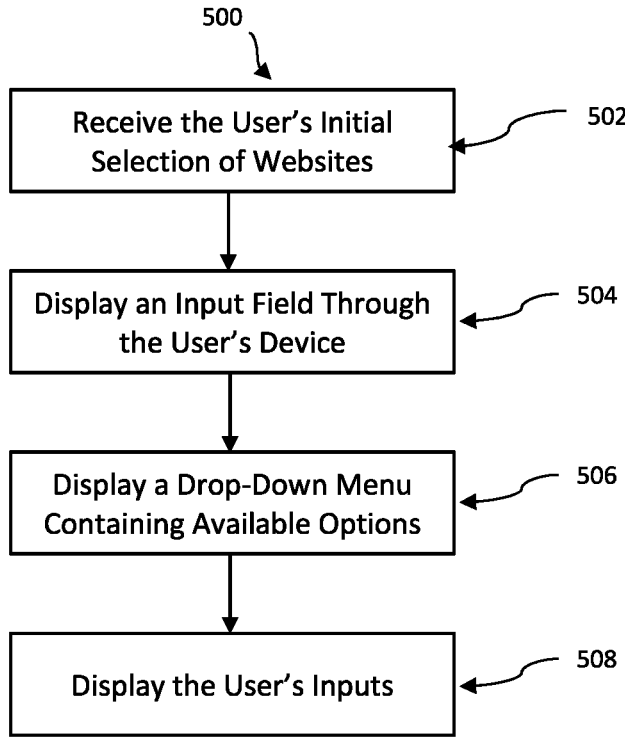
FIG. 5 shows an exemplary method of displaying an input field consistent with the embodiments of the invention.

FIG. 5 depicts an exemplary method for displaying a universal input field 500. An input field may be any type of user interface and may be displayed on any type of operating system, software, or device. The system 500, may "Receive the User's Initial Selection of Websites" at 502, may then "Display an Input Field Through the User's Device" at 504, may provide and "Display A Drop-Down Menu Containing Available Options" at 506 for each input item at 504, and may at 508 that follows next "Display the User's Inputs" based on his/her inputs and interactions.

As detailed above, the Storage and Execution System 103, the Data Bases 104 and the Processing Systems 105 may utilize computing devices. The computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor," or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term a "medium capable of storing data and/or computer-readable instructions" or computer-readable medium, as used herein, generally refers to any form of device, carrier, or medium capable of storing or carrying data and/or computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Unless otherwise noted, the terms "connected to" and "coupled to" (and their derivatives), as used herein, are to be construed as permitting both direct and indirect (i.e., via other elements or components) connection. In addition, the terms "a" or "an," as used herein, are to be construed as meaning "at least one of."

The processor as disclosed herein can be configured with instructions to perform any one or more steps of any method as disclosed herein.

As used herein, the term "or" is used inclusively to refer to items in the alternative and in combination.

The foregoing disclosure provides the basic features of an exemplary embodiment of systems and methods of the invention that may have widespread applications and prove to be very useful to facilitate electronic sales for people who may prefer to make their personal purchases by using online methods. Embodiments of the present disclosure have been shown and described as set forth herein and are provided by way of example only. One of ordinary skill in the art will recognize numerous adaptations, changes, variations and substitutions without departing from the scope of the present disclosure. Several alternatives, modifications and combinations of the embodiments disclosed herein may be utilized without departing from the scope of the present disclosure and therefore, such modifications will be within the inventions disclosed herein. Therefore, reference should be made to the appended claims rather than to the foregoing specification, with regard to the scope of the invention.

What is claimed is:

1. A system for facilitating online sales, comprising:
at least one database stored on at least one memory device, the database storing instructions for operating various input fields and transmitting messages over communication network channels comprising e-mail, short message service (SMS), and/or text messaging; and
at least one processor coupled to the database, the processor executing instructions to:
display to a user, over a communication network, input fields for entering data, messages, selected merchandise, and/or one or more user's personal photos, wherein the input fields are implemented on a window interface on a computer monitor and/or on an SMS interface on a mobile device;
receive from the user, over the communication network, entries into the input fields via a touchscreen interface of the mobile device or the computer, or a window interface of the computer monitor through a keyboard, the entries including the user's selection of merchandise, user's personal measurements, and/or user's one or more personal photos;
display to the user, over the communication network, and based on the received entries and by using instruction codes for customizing measurements data and/or photos, customized measurement data, and/or modified user's photos, wherein the instruction codes include codes for utilizing measurement tables, charts and sizes, and/or photo modification or customization codes;
receive from the user, any one or more choices of merchandise to purchase and communicate the user's one or more choice(s) over the communication network.

2. The system of claim 1, wherein the communication network includes any system for communication via an internet or cellular network and the user's communication device includes a computing device, a mobile device, a cellphone, or a tablet.

3. The system of claim 1, wherein the database includes a permanent database and a temporary database.

4. The system of claim 3, wherein;
the permanent database contains links to various websites, an input field display program for controlling how an input field is displayed, standard measurement tables, charts and sizes for various apparel, instruction codes for using the measurement tables, charts, and sizes and instruction codes for photo modification or customization and/or links to the software, a message transmission and output field display program for controlling how the output is displayed, and
the temporary database contains input provided by the user through an input field program including the user's measurement data and/or the user's one or more personal photos.

5. The system of claim 4, wherein the processor contains an input field display engine for executing control, modification, and display of an input field, a data analysis engine for using and analyzing the user's measurement data, a photo modification engine for modification or customization of the user's one or more personal photos, a message sending engine, an output field display engine for execution, control, and display of the output field based on the user's selections and inputs.

6. A computer-implemented method for facilitating online sales, comprising:

receiving processor executable instructions from a database stored on at least one memory device, for execution by at least one processor coupled to the database;

executing by the at least one processor, the processor executable instructions for:

a) receiving a user's initial selection of website(s) over a communication network, the communication network including any system for communication via an internet or cellular network, b) operating various input fields and transmitting messages over the communication network channels comprising e-mail, short message service (SMS), and/or text messaging, c) displaying to the user, over the communication network, input fields for entering data, messages, and selected merchandise, wherein the input fields are implemented on a window interface of a computer monitor and/or on an SMS interface of a mobile device, d) receiving from the user, and over the communication network, entries into the input fields via a touchscreen interface of the mobile device or the computer, or a window interface of the computer monitor through a keyboard, the entries including the user's personal measurements, and selected merchandise, e) determining, based on the received entries and by using instruction codes for customizing measurement data, customized measurement data for the user, wherein the instruction codes include codes for utilizing measurement tables and charts and sizes, and providing and/or displaying to the user the determined customized measurement data, and f) receiving from the user, any one or more choices of merchandise to purchase and communicating the user's one or more choice(s) over the communication network.

7. The method of claim 6, wherein the input fields displayed to the user at step c also include entries for the user's one or more personal photos, and wherein at step d, the processor's received input includes the user's one or more personal photos, and wherein step e, further comprises modifying and/or customizing the user's one or more personal photos by using the user's one or more choices of merchandise, and by using instruction codes for modifying and/or customizing photos, and step e further comprises displaying the said user's modified and/or customized photo(s) to the user.

8. The method of claim 6, wherein the method comprises displaying the input fields to the user using an application running on an operating system.

9. The method of claim 6, wherein the input fields are displayed to the user on a toolbar of a web browser.

10. The method of claim 6, wherein the input fields are displayed to the user at the top of an e-mail-based web portal.

11. The method of claim 6, wherein displaying the input fields to the user includes displaying drop-down menus including available options.

12. A computer-implemented method for facilitating online sales, comprising:

receiving processor executable instructions from a database stored on at least one memory device for execution by at least one processor coupled to the database;

executing by the at least one processor, the processor executable instructions for:

a) receiving a user's initial selection of website(s) over a communication network, the communication network including any system for communication via an internet or cellular network, b) operating various input fields and transmitting messages over the communication network channels comprising e-mail, short message service (SMS), and/or text messaging, c) displaying to the user, over the communication network, input fields for entering data, messages, selected merchandise, and one or more personal photos, wherein the input fields are implemented on a window interface of a computer monitor and/or on an SMS interface of a mobile device, d) receiving from the user, and over the communication network, entries into the input fields via a touchscreen interface of the mobile device or the computer, or a window interface of the computer monitor through a keyboard, the entries including the user's selected merchandise, and one or more user's personal photos, e) determining, and displaying to the user, customized and/or modified user's photo(s), based on the received entries, and by using instruction codes for customizing and/or modifying photos, wherein the instruction codes include codes for customizing and/or modifying photos, and f) receiving from the user, any one or more choices of merchandise to purchase and communicating the user's one or more choice(s) over the communication network.

13. The method of claim 12, wherein the input fields displayed to the user at step c also include entries for the user's personal measurements, and wherein at step d, the processor's received input includes the user's personal measurements, and wherein further at step e, measurement tables and charts and sizes are provided and instruction codes for utilizing the said measurement tables, charts, and sizes are used, and step e further comprises customizing the user's personal measurements data by using instruction codes for customizing measurement data, and providing and/or displaying the said customized personal measurement data to the user.

14. The method of claim 12, wherein the method comprises displaying the input fields to the user using an application running on an operating system.

15. The method of claim 12, wherein the input fields are displayed to the user on a toolbar of a web browser.

16. The method of claim 12, wherein the input fields are displayed to the user at a top of an e-mail-based web portal.

17. The method of claim 12, wherein displaying the input fields to the user includes displaying drop-down menus containing available options.

* * * * *